(12) United States Patent
Holdmeyer et al.

(10) Patent No.: US 11,313,753 B2
(45) Date of Patent: Apr. 26, 2022

(54) CONTAMINATION TEST RIG

(71) Applicant: Rolls-Royce Corporation, Indianapolis, IN (US)

(72) Inventors: Emily Holdmeyer, Indianapolis, IN (US); Bruce Crook, Mooresville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 70 days.

(21) Appl. No.: 17/012,416

(22) Filed: Sep. 4, 2020

(65) Prior Publication Data
US 2022/0034744 A1 Feb. 3, 2022

Related U.S. Application Data

(60) Provisional application No. 63/057,991, filed on Jul. 29, 2020.

(51) Int. Cl.
*G01M 3/22* (2006.01)

(52) U.S. Cl.
CPC .................. *G01M 3/224* (2013.01)

(58) Field of Classification Search
CPC .................................................. G01M 13/003
See application file for complete search history.

(56) References Cited

U.S. PATENT DOCUMENTS

| | | | |
|---|---|---|---|
| 3,285,272 A * | 11/1966 | Messenger | B64D 37/00 137/256 |
| 4,188,970 A * | 2/1980 | Maidment | B01F 5/04 137/268 |
| 4,978,369 A * | 12/1990 | Pontow | B01J 3/02 48/197 R |
| 9,939,197 B2 * | 4/2018 | Hoffman | F26B 3/02 |
| 10,613,000 B2 * | 4/2020 | Palanganda Poonacha | G01M 15/108 |
| 2014/0075954 A1 * | 3/2014 | Tralshawala | G01M 15/10 60/779 |

(Continued)

FOREIGN PATENT DOCUMENTS

| | | |
|---|---|---|
| CN | 105008806 B | 8/2017 |
| CN | 109029943 B | 6/2020 |
| JP | 2016-057109 | 4/2016 |

OTHER PUBLICATIONS

"GE invests in sand ingestion test facility in Massachusetts," dated Oct. 13, 2014, pp. 1., GE Aviation, Available at URL: https://www.geaviation.com/press-release/other-news-information/ge-invests-sand-ingestion-test-facility-massachusetts.

(Continued)

*Primary Examiner* — Paul M. West
*Assistant Examiner* — Mark A Shabman
(74) *Attorney, Agent, or Firm* — Crowell & Moring LLP

(57) ABSTRACT

System and methods are provided for a contamination test rig that includes a particle injection chamber including a pressure chamber, wherein a hopper, scale, and feeder are inside of the particle injection chamber, and wherein the test valve is disposed in a valve line that runs parallel to a by-pass line. A by-pass valve permits at least a portion of a mixture of air and contaminate particles to flow through the by-pass line instead of through the valve line when the by-pass valve is open, and prevents the mixture of air and contaminate particles from flowing through the by-pass line when closed.

20 Claims, 3 Drawing Sheets

(56) References Cited

U.S. PATENT DOCUMENTS

| | | | | |
|---|---|---|---|---|
| 2014/0328636 A1* | 11/2014 | Stutz, Jr. | ................ | B65G 53/40 |
| | | | | 406/128 |
| 2014/0334244 A1* | 11/2014 | Birouk | .................... | B01F 15/02 |
| | | | | 366/131 |
| 2015/0330886 A1* | 11/2015 | Ho | ..................... | G01N 15/0266 |
| | | | | 356/336 |
| 2017/0065941 A1* | 3/2017 | Ho | ......................... | G01N 15/10 |
| 2018/0172576 A1* | 6/2018 | Young | .................. | G01N 17/002 |

OTHER PUBLICATIONS

"GE uses Sand from Around the World to Test Its Jet Engines," dated Jun. 22, 2015, pp. 1-10, WIRED, Available at URL: https://www.wired.com/2015/06/ge-uses-sand-around-world-test-jet-engines/.

\* cited by examiner

CONTAMINATION TEST RIG

CROSS REFERENCE TO RELATED APPLICATIONS

The present patent document claims the benefit of priority under 35 U.S.C. § 119(e) to U.S. Provisional Patent Application No. 63/057,991, which was filed on Jul. 29, 2020, and is hereby incorporated by reference in its entirety.

TECHNICAL FIELD

This disclosure relates to contamination testing and, in particular, to a contamination rig for a test valve.

BACKGROUND

Present contamination test rigs suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
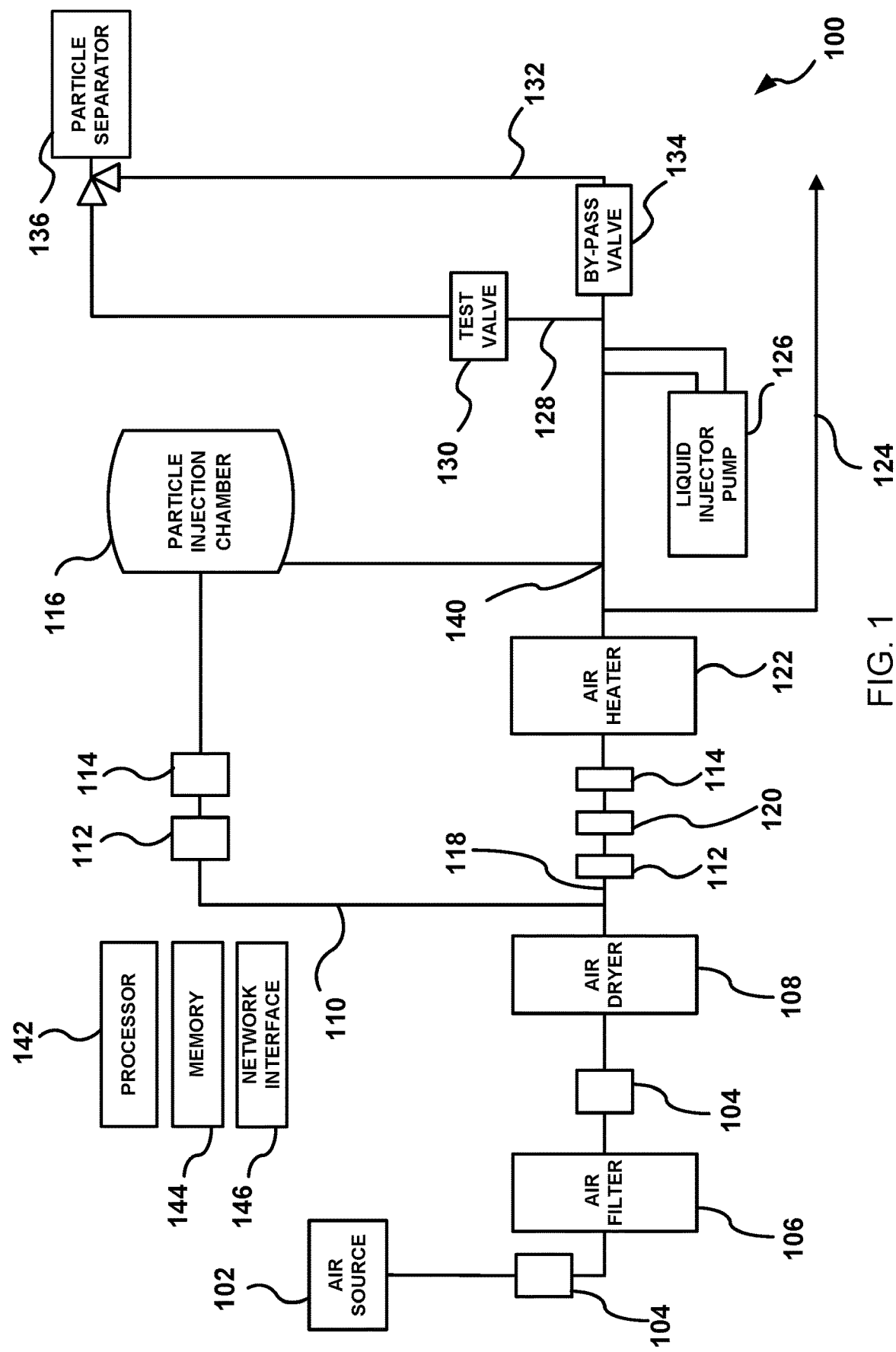
FIG. 1 is a schematic diagram of an example contamination test rig.

Systems and methods of operation of a contamination test rig for testing a test valve are described herein. The term "test valve" refers to a valve that is to be tested by the contamination test rig. The contamination test rig may be referred to as "a dry contamination test rig." In one example, the contamination test rig includes an air source, wherein the air source is configured to supply a flow of air to a heated line and a flow of air to a mix line. The contamination test rig further includes a particle injection chamber included in the mix line, wherein the particle injection chamber may include a pressure chamber.

The particle injection chamber may include a draft tube, wherein the draft tube forms a portion of the mix line. The draft tube has an opening. The draft tube is configured to guide the flow of air through the particle injection chamber and to receive contaminate particles, such as dirt, sand, and/or dust, through the opening. The particle injection chamber may include a hopper, such as a funnel. The particle injection chamber may also comprise a blade. The blade may be part of a conveyor, such as a screw conveyor or an auger. The blade and the hopper are disposed within the particle injection chamber. The blade may be configured to push contaminate particles from the hopper through the opening of the draft tube into the flow of air in the mix line. The particle injection chamber may further comprise a scale.

The contamination test rig may include a junction disposed downstream of the particle injection chamber, wherein the heated line and the mix line merge at the junction. The contamination test rig may include a valve line disposed downstream of the junction, wherein the valve line is configured to receive a mixture of air and the contaminate particles from the particle injection chamber. The valve line may supply the mixture to the test valve if the test valve is coupled to the valve line. The contamination test rig may include a by-pass line arranged in parallel with the valve line. A by-pass valve may be configured to permit at least a portion of the mixture of air and contaminate particles to flow through the by-pass line instead of through the valve line when the by-pass valve is open. The by-pass valve may prevent the mixture of air and contaminate particles from flowing through the by-pass line when closed.

One interesting feature of the systems and methods described below may be that the contamination test rig is capable of allowing a leaking test valve to draw up contaminates even when the test valve is closed. This may represent operating conditions of the test valve in the field, for example, during use of the test valve in a gas turbine engine of an aircraft. Because the by-pass line is located after the valve line, or further downstream of the junction than an inlet to the valve line, the test valve may be subject to leakage flow even when the test valve is closed and the by-pass valve is open.

Alternatively, or in addition, another interesting feature of the systems and methods described below may be that the contamination test rig is a dry rig, meaning dry contaminate particles are injected into the mix line as opposed to a wet slurry. Injecting a wet slurry for contaminate testing requires more piping and a larger test rig in order to dry the wet slurry. Use of a wet slurry in testing may require more maintenance for the test rig and also may lead to a short lifespan of control valves and pumps used in the wet test rig as compared to a dry test rig. It is also more difficult to determine if the mass and/or the consistency of the wet contaminate slurry meets the testing requirements of the test rig and/or test valve.

Alternatively, or in addition, an interesting feature of the systems and methods described below may be that the particle injection chamber includes a pressure chamber so that the inside of the particle injection chamber and the mix line are at substantially the same pressure. Additionally, the hopper, the feeder, and/or the scale are located inside the particle injection chamber and are subject to the same pressure as the mix line. This enables a more precise measurement of the amount of contaminate particles that are injected into the mix line from the hopper and/or feeder.

FIG. 1 is a schematic diagram of an example of a contamination test rig 100. The contamination test rig 100 illustrated in FIG. 1 includes an air source 102, regulation devices 104, an air filter 106, an air dryer 108, a mix line 110, one or more flow regulators 112, one or more air flow meters 114, a particle injection chamber 116, a heated line 118, a relief valve 120, an air heater 122, a bleed line 124, a liquid injector pump 126, a valve line 128, a test valve 130, a by-pass line 132, a by-pass valve 134, a particle separator 136, and a junction 140.

The contamination test rig 100 may be a valve contamination test rig 100, wherein the contamination test rig 100 may be used for contaminate testing of a valve, such as the test valve 130. The contamination test rig 100 may be a dry contamination test rig 100, wherein the contaminate used in the contamination test rig is a mixture of dry contaminate particles as opposed to a wet slurry. The contamination test rig 100 may be able to run unattended. The components of the contamination test rig 100 are described below generally in order of the air flow through the contamination test rig 100.

The air source 102 may be any source of air capable of delivering air, for example, an air compressor. The air source 102 may supply high pressure air, for example, the air source 102 may supply air that is pressurized to 350 psig. In other examples, the air source 102 may supply air at any suitable pressure.

One or more air flow regulation devices 104 may be downstream of the air source 102. The regulation devices 104 may include any components capable of controlling and/or regulating the air supplied by the air source 102. The regulation devices may include, for example, a manual valve, a flow meter, a control valve, a solenoid valve, and/or a relief valve. The regulation devices may be controlled by a processor 142. The processor 142 may control the regulation devices 104 based on a target temperature, pressure, and/or flow rate of the contamination test rig 100. The target temperature, pressure, and/or flow rate may be, for example, a target operating condition at the inlet of the test valve 130.

For example, a temperature sensor at the test valve 130 may communicate with the processor 142. If the temperature at the test valve 130 is below the target operating condition of the test valve 130, the processor may increase the flow of air through the heated line 118 by adjusting the air regulator 112 of the heated line 118, decrease the flow of air through the mix line 110 by adjusting the air regulator 112 of the mix line 110, and/or by increasing the temperature of the air heater 122. Alternatively or additionally, if the temperature at the test valve 130 is above the target operating condition of the test valve 130, the processor may decrease the flow of air through the heated line 118 by adjusting the air regulator 112 of the heated line 118, increase the flow of air through the mix line 110 by adjusting the air regulator 112 of the mix line 110, and/or by decreasing the temperature of the air heater 122.

The air filter 106 may be downstream of the air source 102 and/or one or more of the regulation devices 104. Alternatively or additionally, the air filter 106 may be upstream of one or more of the regulation devices 104. The air filter 106 may be the main air filter 106 of the contamination test rig 100. The air filter 106 may remove debris and contaminate from the air supplied by the air source 102.

The air dryer 108 may be downstream of the air filter 106 and/or one or more of the regulation devices 104. The air dryer 108 may be any dryer capable of drying the air supplied by the air source 102, for example, a refrigerated air dryer. The air dryer 108 may dry the air supplied by the air source 102 in order to keep the humidity levels of the supplied air constant regardless of ambient conditions. The air dryer 108 may dry the air to a specific humidity level based on target operating conditions of the contamination test rig 100.

The mix line 110 and the heated line 118 are disposed downstream of the air dryer 108. Downstream of the air dryer 108, the flow of air supplied by the air source 102 may be split between the mix line 110 and the heated line 118. The mix line 110 may include one of the flow regulators 112, one of the air flow meters 114, and the particle injection chamber 116.

The flow regulator 112 may be any type of valve capable of regulating a flow of air flowing through the mix line 110, for example a high pressure air regulator and/or an electronically controlled high pressure flow regulator, such as a valve sold under the mark of PROPORTION-AIR owned by Proportion-Air, Inc. The flow regulator 112 may control an amount of air flowing through the mix line 110. The air flow meter 114 may be downstream of the flow regulator 112, and may be any flow meter capable of measuring the flow of air through the mix line 110. The air flow meter 114 may be, for example, an ASME (American Society of Mechanical Engineers) orifice plate mass flow meter.

The particle injection chamber 116 may be downstream of the flow regulator 112 and or the air flow meter 112. The particle injection chamber 116 may be or include a pressure chamber. As explained further below, the inside of the particle injection chamber 116 may be at substantially the same pressure as a pressure inside of the mix line 110. For the purpose of this disclosure, the phrase "substantially same," means within a predetermined tolerance. The predetermined tolerance may be, for example, 1, 2, 3, 5, or 10 percent. For example, a first pressure may be substantially the same as a second pressure if the second pressure differs from the first pressure by less than or equal to 10 percent of the first temperature.

Downstream of the air dryer 108, the heated line 118 may include a respective one of the flow regulators 112 and a respective one of the air flow meters 114 as described above. The flow regulator 112 regulates a flow of air flowing through the heated line 118, and the air flow meter 114 measures the flow of air through the heated line 118. The heated line 118 may include the relief valve 120. The relief valve 118 may be downstream of the flow regulator 112 included in the heated line 118 and upstream of the air flow meter 114 included in the heated line 118. The relief valve 120 may be used to protect components of the contamination test rig 100 from over pressure or experiencing a pressure above a component's respective pressure threshold in the event of a failure of control components of the contamination test rig 100, for example, in the event of a mechanical failure of one or more of the flow regulators 112 and/or in the event of a failure of the processor 142. The relief valve 120 may protect hardware components of the contamination test rig 100 such as the air heater 122.

The heated line may include the air heater 122. The air heater 122 may be downstream of the air flow meter 114. The air heater 122 may be any heater capable of heating the air flowing through the heated line 118. For example, the air heater 122 may be an electric air heater, such as a 250 kW inline electric process air heater. The air heater 122 may be controlled by the processor 142 such that the air in the heated line 118 is heated based on a target temperature of the air to be supplied to the test valve 130. The target temperature may be, for example, the same or higher than a target temperature of air to be supplied to an inlet of the test valve 130.

The bleed line 124 may branch off of the heated line 118 downstream of the air heater 122. The bleed line 124 may allow for sufficient air flow through the air heater 122, wherein sufficient means that the bleed line 124 allows for enough air flow through the air heater 122 to prevent damage to the air heater 122 from over temperature or from experiencing a temperature above a temperature threshold of the air heater 122. For example, the bleed line 124 may allow for sufficient air flow through the air heater 122 in the event of low air flow testing of the test valve 130.

The mix line 110 and the heated line 118 may join into a single air flow line at the junction 140. The junction 140 is located downstream of the particle injection chamber 116 of the mix line 110. The junction 140 may be downstream of the air heater 122 and/or downstream of a point where the bleed line 124 branches off of the heated line 118. The junction 140 may, for example, be a T-joint.

The liquid injection pump 126 may be downstream of the junction 140. The liquid injector pump 126 may be any pump capable of injecting liquid contaminates into the flow of air downstream of the junction 140. The liquid contaminates may be, for example, oil and/or salt water. The contamination test rig 100 may include one or more liquid injector pump 126.

The valve line 128 and the by-pass line are downstream of the liquid injector pump 126 and/or the junction 140. The valve line 128 and the by-pass line 132 may be vertically oriented and run be parallel to each other, wherein an inlet to the valve line 128 may disposed be closer to the junction 140 than an inlet to the by-pass line 132.

The valve line 128 may include the test valve 130. The test valve 130 may be downstream of the junction 140 and/or the liquid injector pump 126. The test valve 130 may be a valve for use on an aircraft, for example, a valve used in a gas turbine engine. For example, the test valve 130 may be a pneumatic valve, such as an aircraft accessory valve. As another example, the test valve 130 may be an anti-ice valve (AIV). The test valve 130 may be an AIV that, in operation on an aircraft, is supplied compressor bleed air from an engine of the aircraft. For example, in operation on an aircraft, the AIV may be used to prevent ice build-up on the front of the engine. The AIV, for example, may be fed compressor bleed air from the engine and may heat up the front of the nacelle of the engine.

The by-pass line 132 may include a by-pass valve 134. The by-pass valve 134 may be downstream of the junction 140 and/or liquid injector pump 126. The by-pass valve 134 may be any valve capable of allowing or prohibiting a flow of air from entering an air flow line. For example, the by-pass valve 134 may be a high temperature on/off valve. The by-pass valve 134 may be capable of being in a fully open position or a fully closed position such that no air passes through the by-pass valve 134 when it is closed.

The by-pass line 132 and the valve line 128 may both terminate at the particle separator 136. The particle separator 136 may be downstream of the test valve 130 and the by-pass valve 134. The particle separator 136 may be any separator capable of separating contaminate particles from a flow of air. The particle separator may be, for example, a cyclone separator. The particle separator 136 may exhaust the clean air to the atmosphere once the contaminate particles have been removed from the air.

During operation of the contamination test rig 100, the air source 102 may supply air, for example, high pressure air, to the contamination test rig 100. The air may be supplied at a pressure of, for example, 350 psig. The air may flow from the air source 102 to the air filter 106. The air filter 106 may remove debris and contaminate from the supplied air. The air may flow through one of more of the regulation devices 104 before flowing to the air filter 106. Additionally or alternatively, the air may flow through one of more of the regulation devices 104 after flowing through the air filter 106. The regulation devices 104 may affect the pressure, temperature, and/or mass flow rate of the air upstream and/or downstream of the air filter 106. The regulation devices 104 may be used to control a flow of hot air and/or a flow of cold air to the test line 128 and/or the test valve 130. For example, the regulation devices 104 may control a flow of hot air from the heated line 118 and/or a flow of cold air from the mix line 110. The regulation devices 104 may be electronically controlled by the processor 142.

The air may flow from the air filter 106 and/or from one or more of the regulation devices 104 to the air dryer 108. The air dryer 108 may dry and/or heat the flow of air supplied by the air source 102 in order to keep humidity levels of the air flow constant downstream of the air dryer 108 independent of ambient conditions. In other words, the air dryer 108 may dry the flow of air from the air source 102 to a constant humidity level despite what ambient conditions may be outside of the contamination test rig 100. The constant humidity level may be a humidity level set by the processor 142. The constant humidity level may be based on target operating conditions of the contamination test rig 100, for example, a design requirement of the test valve 130.

Downstream of the air dryer 108, the flow of air splits in to two different lines: the mix line 110 and the heated line 118. The portion of the air that flows into the mix line 110 flows from the air dryer 108 through the flow regulator 112 on the mix line 110. The flow regulator 112 on the mix line 110 may regulate the pressure of the air flow in the mix line 110. The processor 142 may control the flow regulator 112 in order to regulate the pressure of the air and/or an amount of air flowing in the mix line 110. The air may be regulated by the flow regulator 112 on the mix line 110 to a determined pressure and/or flow rate that is needed in order to target a specific temperature, pressure, and/or mass flow rate set point at one or more locations in the contamination test rig 100.

The air in the mix line 110 may flow from the flow regulator 112 on the mix line 110 to the air flow meter 114 on the mix line 110. The air flow meter 114 on the mix line 110 may communicate the air pressure and/or the flow rate of the flow of air in the mix line 110 to the processor 142. The air may flow from the flow regulator 112 on the mix line 110 and/or the air flow meter 114 on the mix line 110 to the particle injection chamber 116. The air may flow through a draft tube 200 (shown in FIG. 2) in the particle injection chamber 116. The draft tube 200 may have an opening 202 (shown in FIG. 2) in the draft tube on a part of the draft tube inside of the particle injection chamber 116. Because of the opening 202, the particle injection chamber 116 may be at the same pressure as the flow of air in the mix line 110. As explained in more detail below in connection with FIG. 2, contaminate particles are injected into the flow of air in the draft tube 200 in the particle injection chamber 116. Referring back to FIG. 1, downstream of the particle injection chamber 116, the flow of air in the mix line 110 includes air mixed with the contaminate particles. The mixture of air and contaminate particles in the mix line 110 may flow from the particle injection chamber 116 to the junction 140 of the mix line 110 and the heated line 118.

The flow of air that splits and flows into the heated line 118 from the air dryer 110 may flow through the respective one of the flow regulators 112 disposed in the heated line 118. The processor 142 may control the flow regulator 112 in the heated line 118. The processor 142 may control the flow regulator 112 in the heated line 118 in order to regulate the pressure and/or flow rate of the air in the heated line 118. The air in the heated line 118 may flow from the flow regulator 112 in the heated line 118 to the relief valve 120. The air may flow past the relief valve 120 through the respective one of the air flow meters 114 disposed in the heated line 118. The air flow meter 114 in the heated line 118 may communicate the air pressure and/or the flow rate of the flow of air in the heated line 118 to the processor 142.

The air in the heated line 118 may flow from the flow regulator 112 in the heated line 118, the relief valve 120 in the heated line 118, and/or the air flow meter 114 in the heated line 118 to the air heater 122. The air heater 122 may heat the flow of air in the heated line 118. The processor 142 may control the air heater 122. The air heater 122 may heat the air in the heated line 118 to a predetermined temperature, for example, 800 degrees Fahrenheit, or, any other target temperature. In some examples, the processor 142 may determine the target temperature based on at least one target temperature set point of one of more locations in the contamination test rig 100, for example, at the inlet of the test valve 130. The air in the heated line 118 may flow from the air heater 122 to the junction 140 of the mix line 110 and the heated line 118.

The flow of air from the heated line 118 and the flow of the mixture of air and contaminate particles from the mix line 110 may mix together at the junction 140 to form a single flow of air that is also a mixture of air and contaminate particles. The air flow meters 114 may communicate with the processor 142. The regulation devices 104, the flow regulators 112, the relief valves 120, the air dryer 108, and/or the air heater 122 may be controlled by the processor 142 in order to ensure that the air flow of the mixed air at the junction 140 meets a set temperature, mass flow rate, and/or pressure. The set temperature, mass flow rate, and/or pressure may be set based on target requirements of the contamination test rig 100. For example, the target requirements may correspond to design requirements of the test valve 130.

In some examples, the liquid injector pump 126 may inject the liquid contaminates into the flow of the mixture of air and dry contaminate particles downstream of the junction 140. Downstream of the liquid injector pump 126, the air and contaminate mixture may flow into the valve line 128. Air may flow through the test valve 130 disposed in, and/or coupled to, the valve line 128. The regulation devices 104, the flow regulators 112, the relief valves 120, the air dryer 108, and/or the air heater 122 may be controlled by the processor 142 in order to ensure that the air flow at the test valve 130 meets a set temperature, mass flow rate, and/or pressure such that the test valve 130 experiences temperatures, pressures, and/or mass flow rate representative of operating conditions in the field. The operating conditions may be, for example, a gas turbine engine during idle, cruse, and/or maximum power, which the test valve 130 must be able to withstand.

When the test valve 130 is open, the by-pass valve 134 in the by-pass line 132 may be closed such that the air and contaminate mixture does not flow through the by-pass line 132. When the test valve 130 is closed, the by-pass valve 134 may be open, allowing for the air and contaminate mixture to flow through the by-pass line 132.

Because the by-pass line is located further away from the junction 140 than the valve line 128, when the test valve 130 is closed and the by-pass valve 134 is open, air and contaminate mixture may still flow to the test valve 130. The test valve 130 may leak when closed. This is known as a leakage condition, and is common for used valves. When the by-pass valve 134 is open and the test valve 130 is closed, the air and contaminate mixture flowing to the test valve 130 may simulate a leakage condition of the test valve 130 by allowing contaminate particles to be drawn up into the test valve 130. The test valve 130 may be tested both when the test valve 130 is open or closed. When the test valve 130 is closed, it may be subject to leakage flow across the test valve 130. The leakage flow across the test valve 130 may simulate when, for example, an AIV in an aircraft experiences leakage across the valve and draws contaminate particles from bleed air into the AIV.

Air and contaminate mixture may flow through the valve line 128 and the test valve 130 to a particle separator downstream of the test valve 130. Alternatively or additionally, air and contaminate mixture may flow through the by-pass line 132 and the by-pass valve 134 to a particle separator downstream of the by-pass valve 134. The particle separator 136 may remove the contaminate particles from the air flows before the air is released into the atmosphere.

Figure 2:
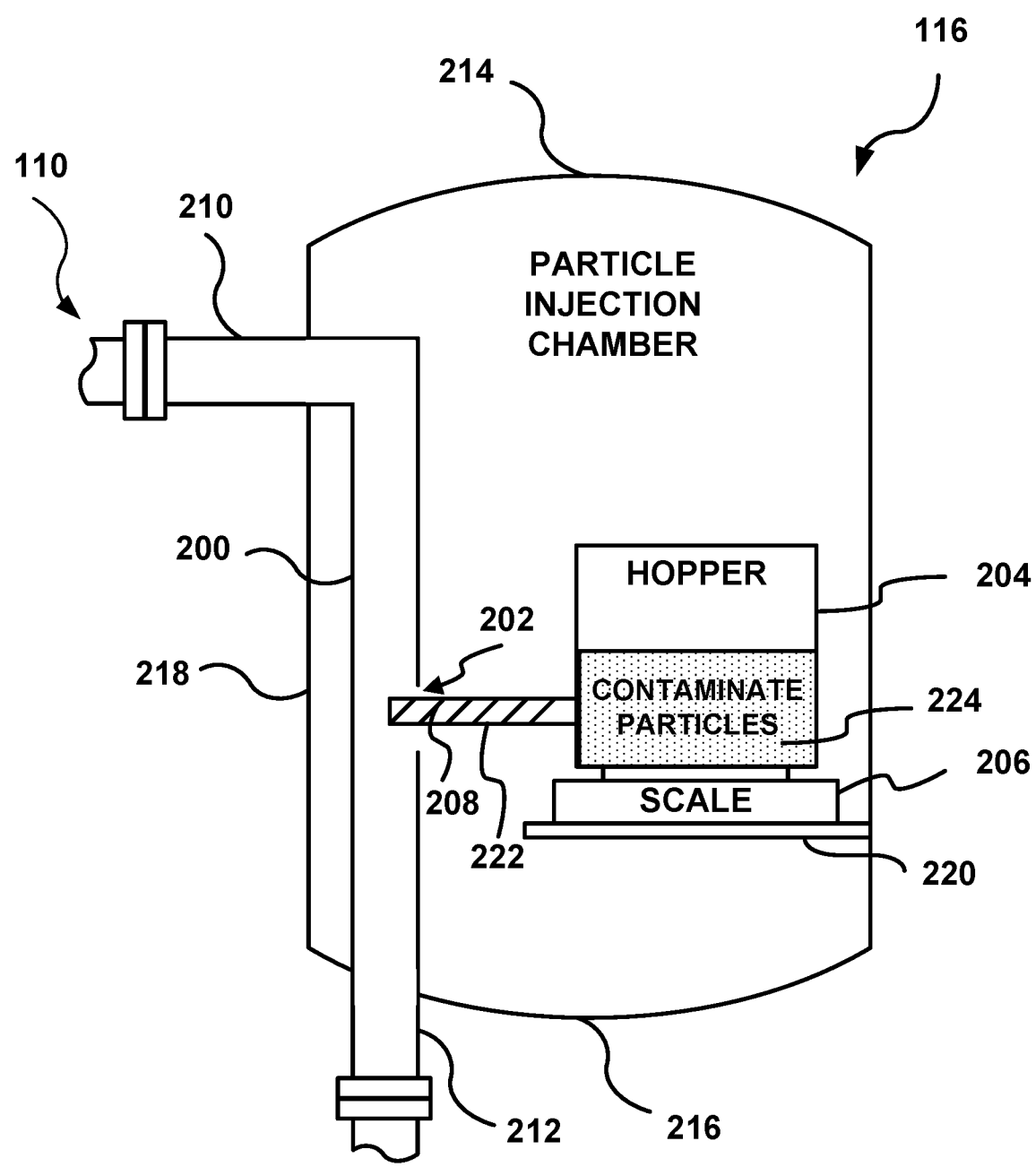
FIG. 2 is a cross-sectional view of an example of a particle injection chamber.

FIG. 2 is a cross-sectional view of an example of the particle injection chamber 116 of the contamination test rig 100 in FIG. 1. The particle injection chamber 116 is disposed on the mix line 110. In other words, the mix line 110 may extend through the particle injection chamber 116 as shown in FIG. 2. The particle injection chamber 116 comprises the draft tube 200, the opening 202 in the draft tube 200, a hopper 204, a scale 206, a blade 208, a platform 220, and a feeder 222 that includes the blade 208. The particle injection chamber 116 may be cylindrical in shape with a rounded top 214 and a rounded bottom 216 opposite the top 214. However, the particle injection chamber 116 may have any other suitable shape. A side 218 of the particle injection chamber 116 may extend from the top 214 of the particle injection chamber 116 to the bottom 216 of the particle injection chamber 116. The terms "top" and "bottom" refer to an orientation of the particle injection chamber 116 where the force of gravity is in a direction extending from the top to the bottom. The particle injection chamber 116 may be a pressure chamber in which the interior of the particle injection chamber 116 may be at a pressure that is substantially the same as a pressure of the air in the mix line 100. For example, a casing of the particle injection chamber may be a pressure chamber. For example, the particle injection chamber 116 and the flow of air in the mix line 100 may be at 200 psi or any other target pressure. The opening 202 in the draft tube 200 enables the pressure in the interior of the particle injection chamber 116 to be substantially the same as the pressure of the air in the mix line 100, An inlet conduit 210 may make up a portion of the mix line 110 and may couple an upstream portion of the mix line 110 to the particle injection chamber 116. The inlet conduit 210 may couple to the particle injection chamber 116 on the side 218 of the particle injection chamber 116 near the top 214 of the particle injection chamber 116. The inlet conduit 210 may couple to the draft tube 200 disposed inside of the particle injection chamber 116.

The draft tube 200 may make up a portion of the mix line 110. The draft tube 200 may extend into the particle injection chamber 116 from the side 218 of the particle injection chamber 116 near the top 214. In some examples, the draft tube 200 may comprise a 90 degree bend such that the draft tube 200 extends into the particle injection chamber 116 near the top 214, bends 90 degrees, and extends parallel to the side 218 of the particle injection chamber 116 and couples to an outlet conduit 212 at the bottom 216 of the particle injection chamber 116. In other examples the draft tube 200 may have a different shape than illustrated in FIG. 2. The outlet conduit 212 may couple the bottom 216 of the particle injection chamber 116 to a downstream portion of the mix line 110.

The opening 202 of the draft tube 200 may be disposed on a portion of the draft tube 200 that extends parallel to the side 218 of the particle injection chamber 116. In some examples, the draft tube 200 may include additional openings within the particle injection chamber 116.

The platform 220 may extend into the particle injection chamber 116 from, for example, the side 218 of the particle injection chamber 116. The platform 220 may extend into the particle injection chamber 116 perpendicular to the side 218. A scale 206 may be disposed on the platform 220. Alternatively or in addition, the platform 220 may be coupled to the particle injection chamber 116 in other ways. For example, the platform 220 may be coupled to the bottom 216 of the particle injection chamber 116.

The scale 206 may be coupled to the platform 220, for example, with mechanical fasteners, such as screws and/or bolts. The scale 206 may be, for example, a weigh scale or any other device capable of measuring weight in relatively small increments. The scale 206 may communicate with the processor 142. The scale 206 is designed to fit inside of the particle injection chamber 116, wherein the particle injection chamber 116 is a pressure chamber. The scale 206 is designed to be able to tolerate the high pressure conditions of the pressure chamber particle injection chamber 116. The range of the scale 206 may be selected to closely match the combined total weight of the hopper 204, the feeder 222, the blade 208, and the contaminate particles 224 inside of the hopper 204 and feeder 222. The range of the scale 206 may be selected for maximum weight reading resolution, or alternatively, sufficient weight reading resolution, in order to discern relatively small changes in the combined total weight of the hopper 204, the feeder 222, the blade 208, and the contaminate particles 224 inside of the hopper 204 and feeder 222 due to flow of contaminate particles 224 being pushed from the feeder 222 into the draft tube 200. The scale 220 may be able to discern the relatively small weight change of an amount of contaminate particles 224 that have been pushed from the feeder 222 into the flow of the air in the mix line 110 over a specific period of time or during a certain number of rotations of the blade 208.

The hopper 204 may be disposed on the scale 206. The hopper 204 may be a funnel or any device capable of containing contaminate particles 224 and, in some cases, funneling the contaminate particles 224 in a desired direction. The hopper 204 may be modified for zero sealing such that the hopper 204 can operate under high pressure, for example, 200-300 psi. Additionally or alternatively, the hopper 204 may be vented and/or made of materials such that the hopper 204 may survive high pressures, such as 200-300 psi.

A feeder 222 may be coupled to the hopper 208. The feeder 222 may extend from the hopper 204 through the opening 202 of the draft tube 200. The feeder 222 may extend into the draft tube 200. The feeder 222 may extend through the opening 202 of the draft tube 200 without contacting a perimeter of the opening 202 or sides of the draft tube 200. The feeder 222 may be any device capable of conveying the contaminate particles 224 from the hopper 204 into the draft tube 200. Examples of the feeder 222 may include, a conveyor, a screw conveyor, and an auger. The feeder 222 may comprise the blade 208. The blade 208 is any component of the feeder 222 that contacts the contaminate particles 224 in the hopper 208 and pushes the contaminate particles 224 into the draft tube 200. The blade 208 may be, for example, a helical screw blade, a flat blade, or any other shaped blade. In some examples, the blade 208 may rotate within the feeder 222 and within the hopper 204. In other examples, the blade 208 may be attached to a conveyor belt.

During operation, air may flow through the mix line 110 into the particle injection chamber 116. The air may flow through the particle injection chamber via the draft tube 200. The hopper 204 may contain the contaminate particles 224, for example, sand, dirt, and/or dust. The hopper 204 may funnel the contaminate particles 224 towards the feeder 222.

The feeder 222 may convey the contaminate particles 224 from the hopper 204 into the flow of air in the draft tube 200. The feeder 222 may push the contaminate particles 224 into the draft tube 200 such that the air in the draft tube 200 mixes with the contaminate particles 224 and carries the contaminate particles 224 downstream. For example, the blade 208 may rotate such that the blade collects the contaminate particles 224 from a bottom of the hopper 204 and conveys the contaminate particles 224 through a length of the feeder and towards an end of the feeder 222 that extends into the draft tube 200. The blade 208 may push the contaminate particles 224 from the feeder 222 into the draft tube 200. The mix of air and contaminate particle may flow through the draft tube 200 towards the bottom 216 of the particle injection chamber 116, through the outlet conduit 212, and/or downstream to the junction 140 (referring to FIG. 1). The hopper 204, feeder 222, and/or the blade 208 may be controlled by the processor 142.

The scale 206 may communicate the amount of the contaminate particles 224 being pushed into the mix line 110 with the processor 142. Alternatively or additionally, one of more of the flow regulators 112 in the mix line 110 and/or heated line 118 may communicate the flow rate of the mix line 110 and/or the heated line 118 to the processor 142. Alternatively or additionally, a flow meter and/or sensor at the test valve 130 may communicate a flow rate experienced at the test valve 130 to the processor 142.

The processor 142 may control the rate at which the feeder 222 and/or the blade 208 push the contaminate particles 224 into the draft tube 200 based on a contaminate target mass flow rate of the test valve 130. The target mass flow rate may, for example, be based on design requirements of the test valve 130. For example, if the contaminate target mass flow rate is below a target flow rate of the test valve 130, the processor 142 may increase the rate and/or amount of the contaminate particles 224 pushed into the draft tube 200 by the feeder 222. Alternatively or additionally, the processor 142 may increase the flow rate of the mix line 110 by adjusting the flow regulator 112 of the mix line 110. If the contaminate target mass flow rate is above the target flow rate of the test vale 130, the processor 142 may decrease the rate and/or amount of the contaminate particles 224 pushed into the draft tube 200 by the feeder 222. Alternatively or additionally, the processor 142 may decrease the flow rate of the mix line 110 by adjusting the flow regulator 112 of the mix line 110.

Referring back to FIG. 2, the scale 220 may supply the weight of the hopper 204, the feeder 222, the blade 208, and/or the contaminate particles 224 inside the hopper 204 and the feeder 222. The scale 220 may detect the change in weight of the hopper 204, the feeder 222, and/or the contaminate particles 224 in the hopper 203 and the feeder 222 as the feeder 202 pushes the contaminate particles 224 from the feeder 222 into the draft tube 200. The processor 142 may control the hopper 204, feeder 222, and/or blade 208 in order to disperse the contaminate particles 224 into the draft tube 200 at a target mass flow rate of the contaminate particles 224. The processor 142 may control and/or alter the rate of the contaminate particles 224 being dispersed and/or the amount of the contaminate particles 224 being dispersed based on feedback from the scale 206. The target mass flow rate of the contaminate particles 224 may be based on representative operating conditions of, for example, a gas turbine engine during idle, cruse, and/or max power, which the test valve 130 must be able to withstand.

Figure 3:
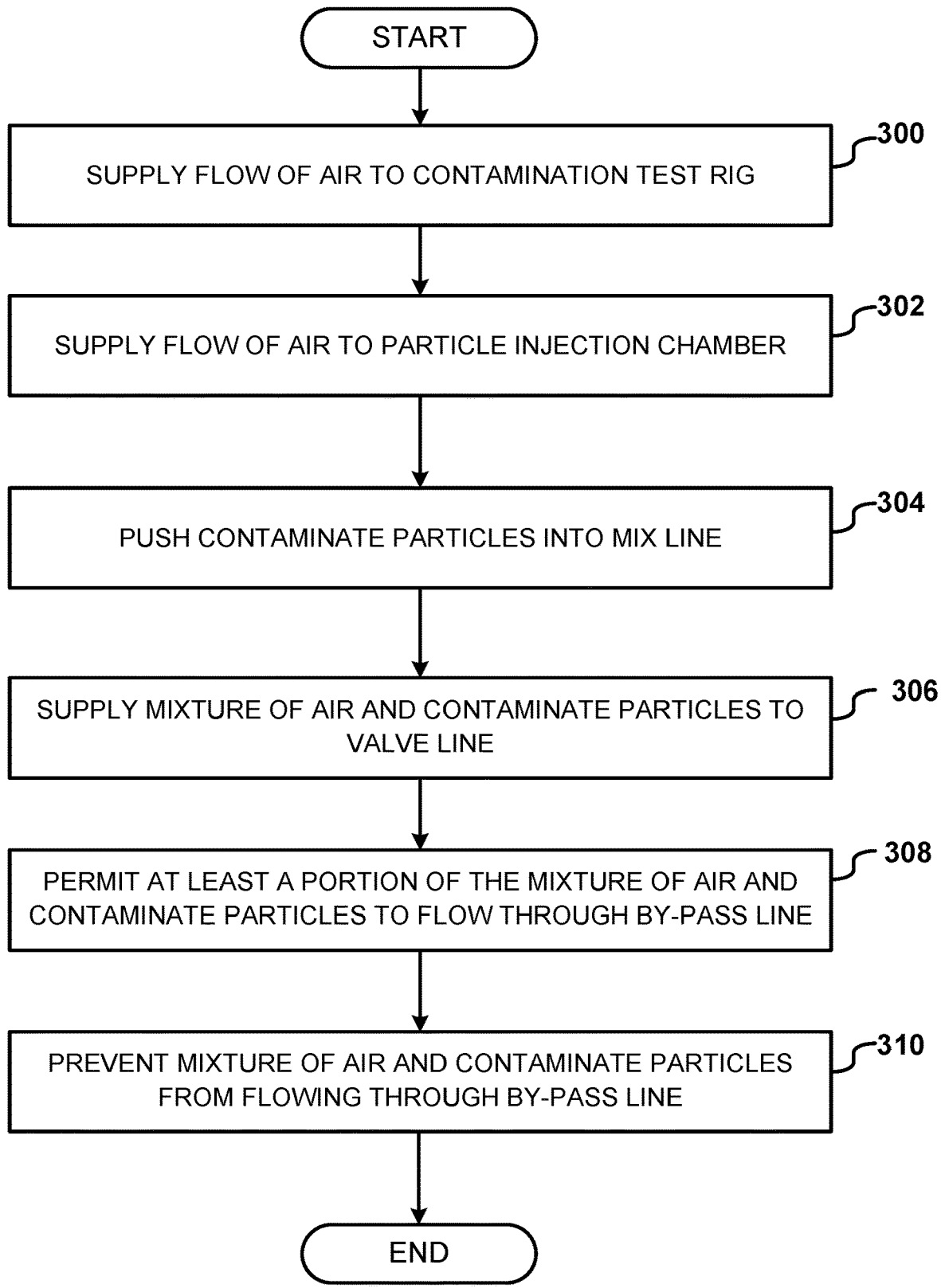
FIG. 3 illustrates a flow diagram of example steps for operating a contamination test rig.

FIG. 3 illustrates a flow diagram of example steps for operating the contamination test rig 100 of FIG. 1. Operation may begin, for example, by supplying (300) the flow of air to the mix line 110 of the contamination test rig 100 from the air source 102. The flow of air may be supplied (302) to the particle injection chamber 116 via the mix line 110, wherein the particle injection chamber 116 may include a pressure chamber.

The blade 208 may push (304) the contaminate particles 224 through the opening 202 of the mix line 110 into the mix line 110. The opening 202 of the mix line 110 may be inside of the particle injection chamber 116, wherein the mix line 110 and the particle injection chamber 116 may be at substantially the same pressure.

The mixture of air and the contaminate particles 224 may be supplied (306) from the particle injection chamber 116 to the valve line 128. The mixture may be supplied to the test valve 130 if the test valve 130 is coupled to the valve line 128.

At least a portion of the mixture of the air and the contaminate particles 224 may be permitted (308) to flow through the by-pass line 132 by opening a by-pass valve 134. The by-pass line 134 may be arranged in parallel with the valve line 128. Alternatively or additionally, the mixture of air and the contaminate particles 224 may be prevented (310) from flowing through the by-pass line 132 by closing the by-pass valve 134.

The steps may include additional, different, or fewer steps than illustrated in FIG. 3. The steps may be executed in a different order than illustrated in FIG. 3. For example the step of permitting (308) at least a portion of the mixture of the air and the contaminate particles 224 to flow through the by-pass line 132 may come before the step of preventing (310) the mixture of air and the contaminate particles 224 from flowing through the by-pass line 132. Alternatively, the step of preventing (310) the mixture of air and the contaminate particles 224 from flowing through the by-pass line 132 may come before the step of permitting (308) at least a portion of the mixture of the air and the contaminate particles 224 to flow through the by-pass line 132. Alternatively or additionally, any one of the steps illustrated in FIG. 3 may occur multiple times and/or in any order.

Although the flow chart in FIG. 3 may appear to imply that the steps illustrated are performed in series, any of the steps illustrated in FIG. 3 may be performed simultaneously. For example, supplying (300) the flow of air to the mix line 110 may occur while pushing (304) the contaminate particles 224 through the opening 202 of the mix line 110 into the mix line 110.

Each component may include additional, different, or fewer components. For example, the feeder 222 and/or the hopper 204 may include a motor. Additionally or alternatively, for example, the contamination test rig 100 may contain additional valves, sensors, flow meters, pressure regulators, temperature regulators, mass flow rate regulators, bleed lines, relief valves, orifice plates, and/or orifice plate mass flow meters.

The contamination test rig 100 may, for example, test a component that gas flows through other than the test valve 130 instead of or in addition to the test valve 130. For example, the contamination test rig 100 may be used for contaminate testing of the component that gas flows through. The component may, for example, be any component used in an aircraft, for example, any component of a gas turbine engine or auxiliary system of an aircraft. The component may be, for example, a flow restrictor, an injector, and/or a nozzle. The component may be, for example, a pneumatic valve, such as a regulating valve, a check valve, an on/off valve, and/or any other similar type of valve.

Additionally, or alternatively, the contamination test rig 100 may include a memory 144, the processor 142, and a network interface 146. The processor 142 may be in communication with the memory 144 and a network interface 146. The processor 142 and other components of the contamination test rig 100 may be in communication with each other. For example, the air source 102, the regulation devices 104, the air dryer 108, one or more of the flow regulators 112, one or more of the air flow meters 114, the particle injection chamber 116, the relief valve 120, the air heater 122, the bleed line 124, the liquid injector pump 126, the test valve 130, the by-pass valve 134, the hopper 204, the scale 206, the blade 208, and/or the feeder 222 may be in communication with the processor 142. Additionally or alternative, the processor 142 may be in communication with one or more sensors located in the junction 140, the mix line 110, the heated line 118, the valve line 128, and/or the by-pass line 132. The sensors may be, for example, pressure sensors, flow sensors, and/or temperature sensors. There may be, for example, optical and/or electrical connections between the controller 142 and each one of the components of the contamination test rig 100 by which the processor 142 and one or more of the components communicate.

In one example, the processor 142 may also be in communication with additional elements, such as a display. Examples of the processor 142 may include a general processor, a central processing unit, a microcontroller, a server, an application specific integrated circuit (ASIC), a digital signal processor, a field programmable gate array (FPGA), a controller, a PLC, and/or a digital circuit, analog circuit.

The processor 142 may be one or more devices operable to execute logic. The logic may include computer executable instructions or computer code embodied in the memory 144 or in other memory that when executed by the processor 142, cause the processor to perform the features implemented by the logic. The computer code may include instructions executable with the processor 142.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a contamination test rig for testing a test valve, the contamination test rig comprising: a mix line; an air source configured to provide a flow of air to the mix line; a particle injection chamber downstream of the air source, wherein the particle injection chamber includes a pressure chamber, the particle injection chamber comprising a draft tube having an opening, wherein the draft tube forms a portion of the mix line, wherein the draft tube is disposed in the particle injection chamber and is configured to guide the flow of air through the particle injection chamber and to receive a plurality of contaminate particles through the opening, and a blade configured to push the contaminate particles through the opening of the mix line into the flow of air; a valve line disposed downstream of the particle injection chamber, the valve line configured to receive a mixture of air and the contaminate particles from the particle injection chamber and to supply the mixture of air to the test valve if the test valve is coupled to the valve line; a by-pass line arranged in parallel with the valve line; and a by-pass valve configured to permit at least a portion of the mixture of air and contaminate particles to flow through the by-pass line instead of through the valve line when the by-pass valve is open, and to prevent the mixture of air and contaminate particles from flowing through the by-pass line when closed.

A second aspect relates to the contamination test rig of aspect 1, wherein the particle injection chamber further comprises a feeder, which includes the blade, and wherein the feeder is coupled to a hopper.

A third aspect relates to the contamination test rig of any preceding aspect, wherein the particle injection chamber further comprises a scale on which a base of the hopper rests, wherein the scale is located inside the particle injection chamber.

A fourth aspect relates to the contamination test rig of any preceding aspect, wherein the test valve includes a pneumatic accessory valve.

A fifth aspect relates to the contamination test rig of any preceding aspect, wherein the test valve includes an anti-ice valve.

A sixth aspect relates to the contamination test rig of any preceding aspect, wherein the opening in the draft tube is open to an interior of the particle injection chamber and, as a result, the opening is configured to permit air in the particle injection chamber to be at substantially the same pressure as air in the mix line.

A seventh aspect relates to the contamination test rig of any preceding aspect, wherein the flow of air provided by the air source is a first flow of air, wherein the air source is configured to provide a second flow of air to a heated air line, wherein the heated air line and the mix line merge at a junction downstream of the particle injection chamber.

An eighth aspect relates to a contamination test rig for testing a component that gas flows through, the contamination test rig comprising: an air source, configured to supply a flow of air to a heated line and a flow of air to a mix line; a particle injection chamber included in the mix line, wherein the particle injection chamber includes a pressure chamber, the particle injection chamber comprising a draft tube, wherein the draft tube forms a portion of the mix line, the draft tube having an opening, the draft tube configured to guide the flow of air through the particle injection chamber and to receive a plurality of contaminate particles through the opening, a hopper, a blade, wherein the blade and the hopper are disposed within the particle injection chamber, and wherein the blade is configured to push contaminate particles through the opening of the draft tube into the flow of air in the mix line, and a scale; a junction disposed downstream of the particle injection chamber, wherein the heated line and the mix line merge at the junction; a valve line disposed downstream of the junction, the valve line configured to receive a mixture of air and the contaminate particles from the particle injection chamber and to supply the mixture to the component if the component is coupled to the valve line; a by-pass line arranged in parallel with the valve line; and a by-pass valve configured to permit at least a portion of the mixture of air and contaminate particles to flow through the by-pass line instead of through the valve line when the by-pass valve is open, and to prevent the mixture of air and contaminate particles from flowing through the by-pass line when closed.

A ninth aspect relates to the contamination test rig of aspect 8, wherein the blade is included in an auger.

A tenth aspect relates to the contamination test rig of any preceding aspect, the contamination test rig further comprising a regulator valve included in the heated line and/or a regulator valve included in the mix line.

An eleventh aspect relates to the contamination test rig of any preceding aspect, wherein a heater is disposed in the heated line upstream of the junction.

A twelfth aspect relates to the contamination test rig of any preceding aspect further comprising a liquid injector pump disposed downstream of the junction and upstream of the valve line and the by-pass line.

A thirteenth aspect relates to the contamination test rig of any preceding aspect, wherein the liquid injector pump is configured to inject liquids downstream of the junction, wherein the liquids include oil, salt, and and/or water.

A fourteenth aspect relates to the contamination test rig of any preceding aspect further comprising an air dryer disposed downstream of the air source.

A fifteenth aspect relates to the contamination test rig of any preceding aspect further comprising a cyclone separator configured to release air into atmosphere, the cyclone separator disposed downstream of the valve line and the by-pass line.

A sixteenth aspect relates to a method for testing a test valve, the method comprising: supplying a flow of air to a mix line of a contamination test rig from an air source; supplying the flow of air to a particle injection chamber via the mix line, wherein the particle injection chamber includes a pressure chamber; pushing contaminate particles through an opening of the mix line into the mix line, wherein the contaminate particles are pushed by a blade, wherein the opening of the mix line is inside of the particle injection chamber, wherein the mix line and the particle injection chamber are at substantially the same pressure; supplying a mixture of air and the contaminate particles from the particle injection chamber to a valve line, wherein the mixture is supplied to a test valve if the test valve is coupled to the valve line; permitting at least a portion of the mixture of air and contaminate particles to flow through a by-pass line arranged in parallel with the valve line by opening a by-pass valve; and preventing the mixture of air and contaminate particles from flowing through the by-pass line by closing the by-pass valve.

A seventeenth aspect relates to the method of aspect 16, the method further comprising supplying a flow of air to a heated line of a contamination test rig, wherein the mix line and the heated line merge downstream of the particle injection chamber and upstream of the valve line and by-pass line.

An eighteenth aspect relates to the method of any preceding aspect, the method further comprising regulating the air in the mix line and/or the heated line via one or more air regulator valves, wherein the one or more air regulator valves control an amount of air in the mix line and/or the heated line.

A nineteenth aspect related to the method of any preceding aspect, wherein the air in the mix line and the heated line are regulated based on at least one target of the contamination test rig, wherein the at least one target may comprise a required temperature, a required pressure, and/or a required air flow rate.

A twentieth aspect relates to the method of any preceding aspect, wherein the method further comprises regulating an amount of contaminate particles pushed into the mix line based on a required contaminate particle mass flow rate of the contamination test rig.

In addition to the features mentioned in each of the independent aspects enumerated above, some examples may show, alone or in combination, the optional features mentioned in the dependent aspects and/or as disclosed in the description above and shown in the figures.

What is claimed is:

1. A contamination test rig for testing a test valve, the contamination test rig comprising:
   a mix line;
   an air source configured to provide a flow of air to the mix line;
   a particle injection chamber downstream of the air source, wherein the particle injection chamber includes a pressure chamber, the particle injection chamber comprising
      a draft tube having an opening, wherein the draft tube forms a portion of the mix line, wherein the draft tube is disposed in the particle injection chamber and is configured to guide the flow of air through the particle injection chamber and to receive a plurality of contaminate particles through the opening, and
      a blade configured to push the contaminate particles through the opening of the mix line into the flow of air;
   a valve line disposed downstream of the particle injection chamber, the valve line configured to receive a mixture of air and the contaminate particles from the particle injection chamber and to supply the mixture of air to the test valve if the test valve is coupled to the valve line;
   a by-pass line arranged in parallel with the valve line; and
   a by-pass valve configured to permit at least a portion of the mixture of air and contaminate particles to flow through the by-pass line instead of through the valve line when the by-pass valve is open, and to prevent the mixture of air and contaminate particles from flowing through the by-pass line when closed.

2. The contamination test rig of claim 1, wherein the particle injection chamber further comprises a feeder, which includes the blade, and wherein the feeder is coupled to a hopper.

3. The contamination test rig of claim 2, wherein the particle injection chamber further comprises a scale on which a base of the hopper rests, wherein the scale is located inside the particle injection chamber.

4. The contamination test rig of claim 1, wherein the test valve includes a pneumatic accessory valve.

5. The contamination test rig of claim 1, wherein the test valve includes an anti-ice valve.

6. The contamination test rig of claim 1, wherein the opening in the draft tube is open to an interior of the particle injection chamber and, as a result, the opening is configured to permit air in the particle injection chamber to be at substantially the same pressure as air in the mix line.

7. The contamination test rig of claim 1, wherein the flow of air provided by the air source is a first flow of air, wherein the air source is configured to provide a second flow of air to a heated air line, wherein the heated air line and the mix line merge at a junction downstream of the particle injection chamber.

8. A contamination test rig for testing a component that gas flows through, the contamination test rig comprising:
   an air source, configured to supply a flow of air to a heated line and a flow of air to a mix line;
   a particle injection chamber included in the mix line, wherein the particle injection chamber includes a pressure chamber, the particle injection chamber comprising
      a draft tube, wherein the draft tube forms a portion of the mix line, the draft tube having an opening, the draft tube configured to guide the flow of air through the particle injection chamber and to receive a plurality of contaminate particles through the opening,
      a hopper,
      a blade, wherein the blade and the hopper are disposed within the particle injection chamber, and wherein the blade is configured to push contaminate particles through the opening of the draft tube into the flow of air in the mix line, and
      a scale;
   a junction disposed downstream of the particle injection chamber, wherein the heated line and the mix line merge at the junction;
   a valve line disposed downstream of the junction, the valve line configured to receive a mixture of air and the contaminate particles from the particle injection chamber and to supply the mixture to the component if the component is coupled to the valve line;
   a by-pass line arranged in parallel with the valve line; and
   a by-pass valve configured to permit at least a portion of the mixture of air and contaminate particles to flow through the by-pass line instead of through the valve line when the by-pass valve is open, and to prevent the mixture of air and contaminate particles from flowing through the by-pass line when closed.

9. The contamination test rig of claim 8, wherein the blade is included in an auger.

10. The contamination test rig of claim 8, the contamination test rig further comprising a regulator valve included in the heated line and/or a regulator valve included in the mix line.

11. The contamination test rig of claim 8, wherein a heater is disposed in the heated line upstream of the junction.

12. The contamination test rig of claim 8 further comprising a liquid injector pump disposed downstream of the junction and upstream of the valve line and the by-pass line.

13. The contamination test rig of claim 12, wherein the liquid injector pump is configured to inject liquids downstream of the junction, wherein the liquids include oil, salt, and and/or water.

14. The contamination test rig of claim 8 further comprising an air dryer disposed downstream of the air source.

15. The contamination test rig of claim 8 further comprising a cyclone separator configured to release air into atmosphere, the cyclone separator disposed downstream of the valve line and the by-pass line.

16. A method for testing a test valve, the method comprising:
   supplying a flow of air to a mix line of a contamination test rig from an air source;
   supplying the flow of air to a particle injection chamber via the mix line, wherein the particle injection chamber includes a pressure chamber;
   pushing contaminate particles through an opening of the mix line into the mix line, wherein the contaminate particles are pushed by a blade, wherein the opening of the mix line is inside of the particle injection chamber, wherein the mix line and the particle injection chamber are at substantially the same pressure;
   supplying a mixture of air and the contaminate particles from the particle injection chamber to a valve line, wherein the mixture is supplied to a test valve if the test valve is coupled to the valve line;

permitting at least a portion of the mixture of air and contaminate particles to flow through a by-pass line arranged in parallel with the valve line by opening a by-pass valve; and preventing the mixture of air and contaminate particles from flowing through the by-pass line by closing the by-pass valve.

17. The method of claim 16, the method further comprising supplying a flow of air to a heated line of a contamination test rig, wherein the mix line and the heated line merge downstream of the particle injection chamber and upstream of the valve line and by-pass line.

18. The method of claim 17, the method further comprising regulating the air in the mix line and/or the heated line via one or more air regulator valves, wherein the one or more air regulator valves control an amount of air in the mix line and/or the heated line.

19. The method of claim 18, wherein the air in the mix line and the heated line are regulated based on at least one target of the contamination test rig, wherein the at least one target may comprise a required temperature, a required pressure, and/or a required air flow rate.

20. The method of claim 16, wherein the method further comprises regulating an amount of contaminate particles pushed into the mix line based on a required contaminate particle mass flow rate of the contamination test rig.

* * * * *